United States Patent [19]

Mason et al.

[11] Patent Number: 5,420,206
[45] Date of Patent: May 30, 1995

[54] FLEXIBLE THERMOPLASTIC COMPOSITIONS COMPRISING NYLON

[75] Inventors: Charles D. Mason, Chatham; Harold W. Tuller, Long Valley; Thomas J. Krollick, Sayreville, all of N.J.

[73] Assignee: AlliedSignal Inc., Morris Township, Morris County, N.J.

[21] Appl. No.: 228,176

[22] Filed: Apr. 15, 1994

Related U.S. Application Data

[63] Continuation of Ser. No. 664,690, Mar. 5, 1991, abandoned.

[51] Int. Cl.⁶ .................. C08F 8/30; C08L 77/00
[52] U.S. Cl. .................. 525/179; 525/181; 525/182; 525/183
[58] Field of Search .......... 525/179, 181, 182, 183

[56] References Cited

U.S. PATENT DOCUMENTS

| | | | |
|---|---|---|---|
| 4,310,638 | 1/1982 | Coran et al. | 525/183 |
| 4,970,255 | 11/1990 | Reimann et al. | 524/80 |
| 5,162,422 | 11/1992 | Lausberg et al. | 524/504 |

FOREIGN PATENT DOCUMENTS

| | | |
|---|---|---|
| 304039 | 8/1917 | European Pat. Off. . |
| 284379 | 3/1924 | European Pat. Off. . |
| 346148 | 9/1989 | European Pat. Off. . |
| 0341731 | 12/1989 | European Pat. Off. . |

OTHER PUBLICATIONS

"Rubber-Thermoplastic Compositions. Part II. NBR-Nylon Thermoplastic Elastomeric Compositions", vol. 53, p. 781 (1980).

"Rubber-Thermoplastic Compositions. Part IX, Blends of Dissimilar Rubbers and Plastics with Technological Compatibilizations" vol. 58, p. 1014 (1985).

*Primary Examiner*—John Kight, III
*Assistant Examiner*—Duc Troung
*Attorney, Agent, or Firm*—Michele G. Mangini; Roger H. Criss; Ernest D. Buff

[57] ABSTRACT

The invention provides novel blends and processes for producing such blends which include a polyamide, an olefinic acid copolymer or salt thereof, and a maleated ethylene/propylene rubber, wherein such novel blends may be processed by conventional extrusion and molding techniques, do not require a separate curing step or procedure in the overall production process, and which produces articles which have some physical characteristics similar to those exhibited by thermoplastic elastomers. The inventive compositions exhibit feature excellent resistance to zinc chloride solutions and are formable in a single melt blending step.

19 Claims, No Drawings

FLEXIBLE THERMOPLASTIC COMPOSITIONS COMPRISING NYLON

This application is a continuation of application Ser. No. 07/664,690, filed Mar. 5, 1991, now abandoned.

BACKGROUND

1. Field of the Invention

The invention is directed to polymeric compositions, particularly to thermoplastic compositions which comprise nylons, and more particularly to flexible thermoplastic compositions comprising nylon.

2. Description of the Prior Art

The use of polymeric materials in engineered material applications is a field of continuing and growing importance as new applications for such materials induce a commensurate growth for new types of materials with improved properties or suited for a particular need.

One such area of growth in is in the area of rubbery thermoplastic polymeric materials which have physical properties which approximate elastomers, and which may be produced and formed into useful articles using conventional methods. Such thermoplastic materials which comprise nylon 6 and which are flexible and are partially elastomeric in character are well known. Such materials are discussed in "Rubber-Thermoplastic Compositions. Part IX. Blends of Dissimilar Rubbers and Plastics with Technological Compatibilization" by A. Y. Coran, R. Patel and D. Williams-Headd published in *Rubber Chemistry and Technology*, Vol. 58, p.1014 (1985), and in "Rubber-Thermoplastic Compositions. Part II. NBR-Nylon Thermoplastic Elastomeric Compositions." by A. Y. Coran and R. Patel published in *Rubber Chemistry and Technology*, Vol. 53, p.781 (1980). These references describe thermoplastic elastomeric materials which include polyamide/nitrile rubbers, and include polyamides, with further constituents such as ethylene/acrylic acid, ethylene/vinyl acetate copolymers and epichlorohydrin and polyureathane as well. In the production of such compositions, the elastomeric or "rubber-phase" are cured through the addition of a curing agent which is added to the compositions during melt blending of the polymer composition prior to subsequent processing.

Further thermoplastic polymeric materials which feature physical properties which approximate elastomers include those which are described in European Patent Application 341,731 which comprise a thermoplastic resin which may be a polyester, polyamide, copolyetherester, or copolyetheramide which forms less than 30 weight percent of the total composition, 50–89 weight percent of an acid containing ethylene copolymer, and 1–22 weight percent of a glycidyl containing copolymer. The compositions described therein are formable in a two-step process, wherein the thermoplastic resin is first reacted with the glycidyl containing copolymer, and the reaction product is then reacted with the acid containing ethylene copolymer. The resultant compositions may be used to form articles by conventional molding procedures.

SUMMARY

The present invention is directed to novel blends which include at least one polyamide, preferably nylon 6, an olefinic acid copolymer or ionomer thereof, and a modified elastomeric polymer, wherein such novel blends may be processed by conventional extrusion and molding techniques, do not require a separate curing step or procedure in the overall production process, and which produces articles which share certain physical characteristics similar to those exhibited by flexible thermoplastic materials. A beneficial feature of the inventive compositions include excellent resistance to zinc chloride solutions.

In a further aspect of the invention, there is provided a process for producing compositions which feature good physical properties and excellent resistance to zinc chloride ($ZnCl_2$) solutions which comprise at least one polyamide, preferably nylon 6, an olefinic acid copolymer or ionomer thereof, and a modified-elastomeric polymer, wherein such novel blends may be produced and processed by conventional extrusion and molding techniques.

In a still further aspect of the invention there are provided molded articles featuring good physical properties and excellent resistance to which comprise at least one polyamide, preferably nylon 6, an olefinic acid copolymer or ionomer thereof, and a modified elastomeric polymer.

DESCRIPTION OF THE PREFERRED EMBODIMENTS

The present invention includes a polyamide composition which comprises a polyamide, an olefinic acid copolymer or ionomer thereof, and a modified elastomeric polymer which is processable by conventional techniques, particularly by a single melt blending operation, e.g. extrusion.

The present invention also includes a polyamide composition which comprises a polyamide, an olefinic acid copolymer or ionomer thereof, and a modified elastomeric polymer which is resistant to zinc chloride comprising solutions.

The present invention further includes a process for producing a thermoplastic molding composition which is resistant to zinc chloride comprising solutions which is formable in a single melt blending step.

Polyamides suitable for use include the long chain polymeric amides having recurring amide groups as part of the polymer backbone and preferably, have a number average molecular weight as measured by end group titration of about 10,000 to 50,000. The polyamides suitable for use herein can be produced by any conventional means known to the art.

Polyamides which find use in accordance with the present invention include those which may be obtained by the polymerization of equimolar proportions of a diamine having two or more carbon atoms between the amine terminal groups with a dicarboxylic acid, or alternately that obtained by the polymerization of a monoamino carboxylic acid or an internal lactam thereof with an equimolar proportion of a diamine and a dicarboxylic acid. Further, suitable polyamides may be derived by the condensation of a monoaminocarboxylic acid or an internal lactam thereof having at least two carbon atoms between the amino and the carboxylic acid groups, as well as other means. General procedures useful for the preparation of polyamides are well known to the art, and the details of their formation are well described under the heading "Polyamides" in the Encyclopedia of Polymer Science and Technology, published by John Wiley & Sons, Inc, Vol. 10, pps.487–491, (1969).

Suitable diamines include those having the formula

wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4trimethylpentamethylenediamine, as well as cycloaliphatic diamines, such as diaminodicyclohexylmethane, and other compounds.

The dicarboxylic acids useful in the formation of polyamides are preferably those which are represented by the general formula

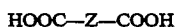

wherein Z is representative of a divalent aliphatic radical containing at least 2 carbon atoms, such as adipic acid, sebacic acid, octadecanedioic acid, pimelic acid, subecic acid, azelaic acid, undecanedioic acid, and glutaric acid. The dicarboxylic acids may be aliphatic acids, or aromatic acids, such as isophtalic acid and terephthalic acid.

By means of example, suitable polyamides include: polypyrrolidone (nylon 4), polycaprolactam (nylon 6), polyheptolactam (nylon 7), polycaprylactam (nylon 8), polynonanolactam (nylon 9), polyundecaneolactam (nylon 11), polydodecanolactam (nylon 12), poly(tetramethylenediamine-co-oxalic acid) (nylon 4,2), poly(-tetramethylenediamine-co-adipic acid) (nylon 4,6), poly(tetramethylenediamine-co-isophthalic acid) (nylon 4,I), polyhexamethylene azelaiamide (nylon 6,9), polyhexamethylene sebacamide (nylon 6,10), polyhexamethylene isophthalamide (nylon 6,IP), polymetaxyllylene adipamide (nylon MSD:6), the polyamide of n-dodecanedioic acid and hexamethylenediamine (nylon 6,12), the polyamide of dodecamethylenediamine and n-dodecanedioic acid (nylon 12,12), as well as copolymers thereof which include: hexamethylene adipamide-caprolactam (nylon 6,6/6), hexamethylene adipamide/-hexamethylene-isophthalamide (nylon 6,6/6IP), hexamethylene adipamide/hexamethyleneterephthalamide (nylon 6,6/6T), trimethylene adipamide-hexamethylene-azelaiamide (nylon trimethyl 6,2/6,2), and hexamethylene adipamide-hexamethylene-azelaiamide caprolactam (nylon 6,6/6,9/6) as well as others which are not particularly delineated here.

Of these polyamides, preferred polyamides include polycaprolactam, which is also commonly referred to as nylon 6, and polyhexamethylene adipamide, which is also commonly referred to as nylon 6,6, as well as mixtures of the same. Of these, polycaprolactam is most preferred.

The synthesis of nylon 6 may proceed from ε-aminocaproic acid which upon heating with water produces nylon 6, as is disclosed in U.S. Pat. No. 2,241,321 to P. Schlack. Other suitable methods are well known to the art and include those described in U.S. Pat. Nos. 2,234,566; 2,249,177; 2,970,997; 3,000,877; 3,000,878; 3,000,879; 3,016,375 as well as others.

Polyamides such as nylon 6 and nylon 6,6 suitable for use in the instant invention may comprise a variety of terminal functionalities, which include the preferred terminal functionalities of: a carboxyl group as both terminal groups in the polyamide chain, a carboxyl group attached to one end of the polyamide chain, and an amide group attached to the other end of the polyamide chain, an amino group attached to both ends of the polyamide chain, and a carboxyl group attached to one end and one amino group attached to the other end of the polyamide chain. Monocarboxylic acids or dicarboxylic acids, including acetic acid, azelaic acid, or sebacic acid can be used to terminate the polyamide chain. Preferred polyamides feature an equal number of amine groups to acid groups, (also referred to as "balanced" end groups) as well as those which feature a preponderance of amine groups to acid groups.

In preferred embodiments the nylon 6, nylon 6,6 or blends thereof feature a number average molecular weight of between about 10,000 and about 50,000; preferably between about 15,000 and about 40,000; most preferably between about 20,000 and about 30,000. The basis for this particular order of preferences is based on observations that the mechanical properties improve rapidly with increasing numerical average molecular weight to about 20,000 and processing becomes more difficult when the number average molecular weight approaches and/or exceeds about 30,000.

A further constituent used in the inventive compositions are modified elastomeric polymers, also interchangeably referred to herein and in the art as elastomers or rubbery polymers. Such useful elastomeric polymers which may be subsequently modifed include a copolymer of ethylene and an α-olefin other than ethylene. The α-olefin preferably is an α-olefin selected from at least one $C_3$–$C_8$, and preferably is an α-olefin selected from at least one $C_3$–$C_6$ α-olefin. Propylene is a preferred monomer selected as the $C_3$–$C_8$ α-olefin copolymer. Other $C_3$–$C_6$ α-olefins which find use in conjunction with the composition include 1-butene, 1-pentene, and 1-hexene can be used in place of or in addition to propylene in the copolymers.

The copolymer has an average of at least two, preferably from 2 to 10, more preferably 2 to 6, and most preferably 2 to 4 reactive moieties per copolymer molecule which is preferably grafted to the copolymer. It is believed that the greater than one reactive moiety groups on the reactive copolymer enhances the networking between the amine end groups of the polyamide and the reactive copolymer. The reactive moiety may be a carboxyl or carboxylate functionality, which can be supplied by reacting the ethylene/$C_3$–$C_6$ α-olefin copolymer with an unsaturated reactive moiety taken from the class consisting of α,β-ethylenically unsaturated dicarboxylic acids having from 4 to 8 carbon atoms, or derivatives thereof; such derivatives include anhydrides of the dicarboxylic acids, or the metal salts of the acids, or the monoester of the dicarboxylic acid having from 0 to 100 percent of the carboxylic acid groups ionized by neutralization with metal basic salt and the like. Illustrative of such acids and derivatives are:

maleic acid,
maleic anhydride,
maleic acid monoethyl ester,
metal salts of maleic acid monoethyl ester,
fumaric acid,
fumaric acid monoethyl ester,
itaconic acid,
vinyl phthalic acid metal salts of fumaric acid monoethyl ester, monoesters of maleic or fumaric acid or itaconic acids wherein the alcohol is methyl, propyl, isopropyl, butyl, isobutyl, hexyl, cyclohexyl, octyl, 2-ethyl hexyl, decyl, stearyl, methoxy ethyl, ethoxy ethyl, hydroxy or ethyl, and the like. The reactive moiety can be grafted to the ethylene copolymer by any well-known grafting process. Alternatively, the reactive moiety can be copolymerized into the backbone of the ethylene co-polymer; the reactive copolymer can include or more types of reactive moieties.

The preferred modifiers are the anhydrides of cyclic aliphatic acids. The most preferred modifier is maleic anhydride. The use of this modifier in conjunction with the most preferred elastomer provides a maleated ethylene/propylene copolymer. Such preferred reactive copolymer of ethylene and an $\alpha$-olefin contains from 30–60 percent, and preferably 40–45 percent by weight of the $\alpha$-olefin based on the ethylene. The copolymer also contains from 0.1 to 10 percent, preferably 0.1 to 5 percent, more preferably 0.3 to 2.0 percent by weight of the reactive moiety. The reactive copolymer has a number average molecular weight of from 21,000 to 100,000, preferably 2,000 to 65,000, more preferably 5,000 to 35,000, and most preferably 5,000 to 20,000. Typical values of reduced solution viscosity (RSV) are from 0.5 to 3.5. A RSV of 2.8 corresponds to a number of average molecular weight of about 80,000; an RSV of 2.0 corresponds to a number average molecular weight of about 35,000; an RSV of 1.0 corresponds to a number average molecular weight of 12,000 where the measurements of the RSV is as in a 0.1% solution in decalin at a temperature of 135 deg. C.

Exemplary modified elastomers which are commercially available are included in the subsequent examples.

The inventive compositions may include olefinic acid copolymers having units derived from an $\alpha$-olefin of the formula $RCH=CH_2$ wherein R is hydrogen or an alkyl radical of 1–8 carbon atoms, and which further comprises a second unit which may be derived from an $\alpha,\beta$-ethylenically unsaturated carboxylic acid. The alkyl radical of 1–8 carbon atoms is an $\alpha$-olefin which may be ethylene, propylene, butene-1, pentene-1, hexene-1, heptene-1, 3-methylbutene-1, 4-methylpentene-1, as well as others $\alpha$-olefins. The copolymer herein described is also interchangeably referred to as the "base" copolymer as it forms the base unit of the olefinic acid copolymer and of the ionic copolymer which form part of the compositions according to the invention.

The second unit of the base copolymer may include an $\alpha,\beta$-ethylenically unsaturated carboxylic acid group containing monomer preferably of between 3 to 8 carbon atoms inclusive; examples of such useful monomers include acrylic acid, methacrylic acid, ethacrylic acid, itaconic acid, maleic acid, fumaric acid, monoesters of dicarboxylic acid which by way of example includes methyl hydrogen maleate, methyl hydrogen fumarate, ethyl hydrogen fumarate and although it is not a carboxylic acid as it lacks a hydrogen attached to carboxyl groups, maleic anhydride exhibits chemical reactivity similar to that of an acid and is to be considered suitable for use. Other $\alpha,\beta$-ethylenically unsaturated anhydrides of carboxylic acids can be employed as well.

Further, the base copolymer being described need not be limited to solely a two-component copolymer but is meant to further include other copolymerizable monoethylenically unsaturated monomers which my be used in combination with the $\alpha$-olefin and the $\alpha,\beta$-ethylenically unsaturated carboxylic acid group containing monomer. Particularly, terpolymers featuring these characteristics are also contemplated to be useful as the so called base copolymers and in forming both the olefinic acid copolymers as well as the ionic copolymer constituents which form part of the instant invention. The use of such a further copolymerizable monoethylenically unsaturated monomer augments the possible range of base copolymers which may be used in producing the ionic copolymer resin. By way of example, these include: ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymer, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers-/ethylene/vinyl fluoride/methacrylic acid copolymers, and ethylene chlorotrifluoroethylene/methacrylic acid copolymers.

The concentration of the second unit of the base copolymer is preferably 50 percent or less of the total of the base copolymer, and most preferably 20 percent or less. The base copolymer resins may be random copolymers or terpolymers, or copolymers or terpolymers having regularly repeating units.

The preparation of the copolymers or terpolymers which comprise the base copolymers may be in accordance with any of a plurality of methods known to those skilled in the art, including the copolymerization of a mixture of the first and second components, and in the alternative, the copolymerization of a mixture of first, second and third components wherein the three components may be simultaneously combined or non-simultaneously combined.

Ionomers which find use in compositions according to the present invention include the metal salts of the olefinic acid copolymers described above which may be prepared by neutralizing a percentage of the acid groups of the base copolymer described previously with metal ions. As discussed before with reference to the olefinic acid copolymer, ionomers useful in the present invention need not be limited to being a two-component copolymer but is meant to further include other copolymerizable monoethylenically unsaturated monomers which my be used in combination with the $\alpha$-olefin and the $\alpha,\beta$-ethylenically unsaturated carboxylic acid group containing monomer. Particularly, terpolymers featuring these characteristics are also contemplated to be useful as so called base copolymers and in forming the ionic copolymer resin useful in the instant invention and includes those which have already been described in conjunction with the olefinic acid containing copolymers.

The preparation of the copolymers or terpolymers used in forming ionomers of the olefinic acid copolymer may be in accordance with any of a plurality of methods known to those skilled in the art, including the copolymerization of a mixture of the first and second components, as well as the copolymerization of a mixture of first, second and third components.

The base copolymers may be subsequently neutralized to form the ionomer thereof, by contacting the base copolymer with a basic compound which contains a particular metal ion in order to obtain the desired degree of neutralization. What is to be understood by the term "neutralization" is that the acid groups of the base copolymer are reacted with the particular metal ion in order to obtain the ionomer. Useful metal ions may include those which have a valence of 1 to 3 inclusive, and particularly include those of Groups IA, IB, IIA, IIB, IIIA, IVA, VA, VIB, VIIB, and VIIIB of the Periodic Table of Elements. Preferred metals include: lithium, sodium, potassium, calcium, beryllium, magnesium, zinc, cadmium, strontium, aluminum, lead, chromium, molybdenum, manganese, iron, cobalt, germanium, nickel, copper, silver, mercury, tin, platinum, boron, antimony, copper manganese, zinc, lithium, calcium and lead. Most preferred is zinc. Of these metal ions, zinc ions are preferred and most preferred for use in neutralization of the base copolymer and forming the ionomer therefrom.

The degree of neutralization of the ionic copolymer by the metal cations should be at least about 10% of the carboxylic acid groups of the base copolymer. The preferred range of neutralization is between about 30% and about 100% of the acid groups present in the base copolymer, generally it is most desirable that the preferred range of neutralization is in excess of about 50% of the acid groups present in the base copolymer. The degree of neutralization may be measured by several techniques known in the art, including infrared analysis or titration. These techniques as well as other suitable techniques are disclosed in "Ionic Copolymers" by L. Holliday, published by John Wiley & Sons, New York (1975) at pp. 74-75. The degree of neutralization of the ionomer may vary, and due to such variation it should be realized that differing amounts of metal ions may need to be intimately contacted such as in a blending or mixing process, with the base copolymer; it is to be understood that an excess of the metal ions may be used in order to form the ionomer useful in the present invention.

A feature of such ionomers is that in its non-molten state the ionomer acts as if it were cross-linked, due to the ionic attraction forces, but in its molten state, and subject to the shear forces commonly encountered in fabrication devices which disrupts the ionic attraction, acts much like a linear base copolymer and feature good melt processability as a behavioral characteristic. Subsequent to a fabrication or forming step, the ionic nature of the ionomer reforms cross-links and the solidified ionomer where the composition would be allowed to solidify, the ionomer again displays cross-linked type properties.

Such ionomers which are useful in the practice of the present invention are commercially available from E.I. DuPont de Nemours Co. under the trademark "Surlyn" which identifies a family of ionomer copolymer resins. Suitable ionomer copolymer resins include those which are described in U.S. Pat. No. 3,264,272 to Rees, the description of which is herein incorporated by reference.

The compositions of the present inventions comprise a polyamide, an olefinic acid copolymer or ionomer thereof, and a modified elastomeric polymer wherein the relative weight percentage of the polyamide to these other constituents is a minor percentage, that is to say, less than 50% by weight of the total weight of these constituents. It has been observed that when the relative weight percentage of the polyamide is limited to less than 50% by weight, that it does not form the dominant phase in the thermoplastic composition and is believed to be simply dispersed and grafted to the other elastomeric components of the thermoplastic composition. While not being bound to any theory, it is believed that the limitation of the polyamide so to form a minor percentage of composition allows for the composition to exhibit a more flexible behavior than in compositions wherein nylon forms the dominant phase of such a composition.

In one embodiment, the composition of the present invention may be comprised of up to 50 weight percent of a polyamide, between 1 and 49 weight percent of at least one modified ethylene copolymer comprising units of a $C_3$-$C_8$ alphaolefin other than ethylene, and between 1 and 49 weight percent of an ionomer of at least one olefinic acid copolymers having units derived from an alpha-olefin of the formula $RCH=CH_2$ wherein R is hydrogen or an alkyl radical of 1-8 carbon atoms, and a second unit derived from an $\alpha,\beta$-ethylenically unsaturated carboxylic acid and where the copolymer is between 10%-100% neutralized by a metal ion.

The composition of the invention may optionally also include one or more conventional additives which do not materially affect the physical properties of the inventive composition; the use of such additives may be desirable in enhancing the processing of the compositions as well as improving the products or articles formed therefrom. Examples of such include: stabilizers, lubricants, mold release agents, flame-retarding agents, oxidation inhibitors, dyes, pigments and other coloring agents, ultraviolet light degradation inhibitors, fillers including particulate and fibrous fillers, reinforcing agents, nucleators, plasticizers, as well as other conventional additives known to the art.

The compositions of the instant invention may also include one or more conventional additives which do not materially affect the impact properties of the compositions including: lubricants and mold release agents, coloring agents including dye and pigments, flame-retardants, fibrous and particulate fillers and reinforcing agents (both organic and inorganic), nucleators, oxidation inhibitors and stabilizers, thermal stabilizers, ultraviolet light stabilizers, as well as other additives. These conventional additives may be incorporated into compositions at any suitable stage of the production process; typically such conventional additives are included in the mixing step and included in an extrudate.

By way of example, representative ultraviolet light stabilizers include various substituted resourcinols, salicylates, benzotriazole, benzophenones, and the like.

Suitable exemplary lubricants and mold release agents include stearic acid, stearyl alcohol, stearamides.

Exemplary flame-retardants include organic halogenated compounds, including decabromodiphenyl ether and the like.

By way of example, suitable coloring agents including dyes and pigments include cadmium sulfide, cadmium selenide, titanium dioxide, phthalocyanines, ultramarine blue, nigrosine, carbon black and the like.

Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof.

Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

By way of example, and not by way of limitation, suitable fillers include inorganic fillers, including those of fibrous and granular nature, as wells as mixtures thereof. The fibrous fillers include glass, silica glass, ceramic, asbestos, alumina, silicon carbide, gypsum, metal (including stainless steel) as well as other inorganic and carbon fibers. The granular fillers include wollastonite, sericite, asbestos, talc, mica, clay, kaolin, bentonite, and silicates, including alumina silicate. Other granular fillers include metal oxides, such as alumina, silica, magnesium oxide, zirconium oxide, titanium oxide. Further granular fillers include carbonates such as calcium carbonate, magnesium carbonate, and dolomite, sulfates including calcium sulfate and barium sulfate, boron nitride, glass beads, silicone carbide, sialon as well as other materials not specifically denoted here. These fillers may be hollow, for example glass microspheres, silane balloon, carbon balloon, and hollow glass fiber. Preferred inorganic fillers include glass fibers, carbon fibers, metal fibers, potassium titanate whisker, glass beads, glass flakes, wollastonite, mica, talc, clay, titanium oxide, aluminum oxide, calcium carbonate and barium sulfate. Particularly, glass fiber is most preferred.

The inorganic fillers should preferably be treated with silane, titanate, or another conventional coupling agent, and glass fibers should preferably be treated with an epoxy resin, vinyl acetate resin or other conventional converging agent.

One additive which has been found to improve the compatibility between the polyamide, particularly the polyamide, with a polyolefin is the inclusion of amounts of magnesium oxide to the inventive compositions. Magnesium oxide, when added to a composition in an a relatively small amount, for example, an amount to comprise 5% by weight, preferably and most preferably 2% and less by weight relative to the total weight of a composition, is noted enhance the compatiblity between the a polyamide and a polyolefin within the inventive compositions. It has been further found that the inclusion of such minor amounts of magensium oxide does not significantly detract or diminish the physical properties of the composition within which it is used as compared to a like composition without the inclusion of magnesium oxide.

A further advantageous constituent which acts as a useful viscosity reducing agent is elastomeric polymer of the type which is described above which in contrast to the above constituent is non-modified. The use of the non-modified elastomeric polymer provides for a useful viscosity reduction to the overall composition, improving the processability of the composition particularly in conjunction with standard process machinery, especially screw type extruders, while retaining good impact and flexural properties. Such a non-modified elastomeric polymer may be included in quantities to comprise up to 50 weight percent of the overall composition.

Blending or mixing of the constituents which comprise the composition may be by any effecive means which will effect their uniform dispersion. All of the constituents are to be mixed simultaneously by a mixer, blender, kneader, roll, extruder, or the like in order to assure a uniform blend of the constituents. The most common method is to melt-knead a previously dry-blended composition further in a heated extruder provided with a single-screw, or in the alternative, a plurality of screws, extrude the uniform composition into strands extrude the uniform composition into strands, and subsequently chopping the extruded strands into pellets. The resulting molding composition may be subsequently provided to the feed hopper of a molding apparatus used for forming articles, or alternately, the molding composition may be stored.

In contrast to the suggestions of the prior art, it has surprisingly been found that the inventive compositions may be successfully produced by conventional melt blending methods by combining all the constituents making up a composition and blending them in a single blending or mixing operation, as contrasted to operations wherein less than all of the constituents are first preblended in a first melt blending operation, after which the product from this first operation is subsequently combined with the remaining constituents and then melt blended in a second operation to form the final mixture.

A further advantageous feature of the present invention is that compositions in accordance with the present teachings eliminate the need for curatives or curing agents in the compositions which are usually required to cross-link an elastomeric constituent which might be used in compositions forming the prior art. Typically these are combined and blended in a separate mixing or blending operation prior to subsequent processing. Further, the lack of a curing agent further removes the requirement of a curing reaction or curing step, also known to the art as a "vulcanization step" in a process for forming articles from such compositions, which might otherwise be necessary. Such limitations are overcome by the present invention wherein the constituents may be combined and extruded without the necessity of additional curing constituents or of a curing step in the production process.

The compositions of the present invention may be used for the production of articles formable from thermoplastic materials. By way of example and not of limitation, such articles include sheets, films, rods, tubes, profiled shapes, coatings, parisons for blow molding, as well as others not particularly denoted here. Typically, the composition will be used to form products by injection molding a quantity of the composition which has been previously produced by an extrusion process into pellets, by first heating the preformed pellets to a fluid melt under the action of applied heat, compression and shear effects, and subsequntly forcing a quantity of the said melted composition into mold or form where it is allowed to solidify.

Surprisingly, it has also been found that compositions according to the inventive teachings do not require additives or a melt blending step prior to processing; by coextruding the nylon with the maleated rubber in conjunction with the ionomer or olefinic acid copolymer that there is realized a cross-linked rubber network which is chemically bound to the nylon matrix. In such a system, the ethylene/propylene copolymer having more than one maleic anhydride per chain is used, and as the olefinic acid or salt of the ionomer has a high carboxylate content, the cross-linking reaction may occur. Nonetheless, the extent of cross-linking is limited so that the composition can be processed like a thermoplastic elastomer using conventional techniques.

The foregoing invention will be more apparent by reference to specific embodiments which are representative of the invention. It is nonetheless to be understood that the particular embodiments described herein are provided for the purpose of illustration, and not be means of limitation, and that it is to be further understood that the present invention may be practiced in a manner which is not exemplified herein without departing from its scope.

EXAMPLES

In the following examples of inventive compositions and comparative compositions, it is to be understood that all quantities are parts by weight; any exceptions to this convention will be particularly denoted as being otherwise.

Examples 1-5

Compositions denoted on Table 1 were produced using the following recited constituents and generally in accordance with the production protocol outlined below.

TABLE 1

|  | Example: | | | | |
| --- | --- | --- | --- | --- | --- |
|  | 1 | 2 | 3 | 4 | 5 |
| Nylon 6 | 40 | 20 | 34 | 50 | 34 |
| Nylon-X |  | 20 |  |  |  |
| Exxon #5 | 30 | 30 |  |  |  |
| Surlyn 9721 | 30 | 30 | 33+ |  |  |
| G-203 |  |  | 33+ | 25+ | 33+ |
| EAA |  |  |  | 25+ | 33+ |

"+" indicates that constituents were first pre-extruded together and then reextruded with the remaining constutuents of a blend composition The Nylon-6 used was a nylon-6 having a preponderance of amine terminal groups and which is further described as having approximately 80% to 85% amine end groups, and a formic acid viscosity (FAY) of 55-57 and a number-average molecular weight of approximately 19,500. As an alternate polyamide, "Nylon-X", a nylon-6 having a balance of terminal end groups, wherein the number of amine terminal end groups was approximately equal to the acid terminal end groups, and which is further described as having a formic acid viscosity of 70 and having a "balance" of end groups, specifically as having 50 mole percent amine end groups and 50 mole percent amine end groups is used. EAA is an ethylene/acrylic acid copolymer described as being 93.5% by weight of polyethylene, and 6.5% by weight of acrylic acid and commercially available under the tradename Primacor ® 3330 from the Dow Chemical Co. Exxon #5 is an ethylene/propylene elastomer described as having a molecular weight of 56,000 and includes 0.56% grafted maleic anhydride. The constituent Surlyn ® 9721 is a zinc ionomer resin described as a modified ethylene copolymer having a melt flow index of 1.0 as measured in accordance with ASTM D-1238 and which is commercially available from DuPont. The constituent G-203 is an ethylene/propylene rubber which is described as having a molecular weight of 58,000, and which further includes 0.70% grafted maleic anhydride.

The exemplary compositions were formed by providing the mixed constituents, which may be premixed by tumble blending, such as in a sealed vessel or a sealed bag, and then melt blending these above described constituents in a NRM single screw extruder with a length to diameter ratio (L/D) of 24/1 and equipped with a general purpose extruder screw. The NRM single screw extruder was operated under the following conditions: four melt zones 1-4 were maintained at 270 deg. C., and the die was maintained at 260 deg. C.; screw rotational speed was 80-82 rpm. The extruded composition was rapidly passed through a water bath and subsequently passed through a pelletizer where they were pelletized and the pellets collected. For particular examples wherein some but not all of the constituents were first premixed and preextruded after which the extrudate so formed was later reblended and reextruded with the remaining constituents of a composition, the constituents which were first premixed were processed in accordance with the protocol outlined above.

Test specimens having a standard ASTM "dumbbell" configuration were prepared on a Van Dorn molding machine set at a temperature approximately 30 deg. C. above the melting point of the polyamide contained in each of the compositions. The mold temperature was maintained at 48.8 deg. C. (120 deg. F.). The molding cycle was 10 to 25 seconds forward ram, and 20 to 30 seconds on hold. The test specimens formed were subsequently subjected to physical testing in accordance with ASTM D-638 to evaluate the tensile and elongation characteristics, and in accordance with ASTM D-790 to determine the flexural modulus. The Shore D hardness was evaluated in accordance with ASTM D-1484 testing procedures. The results of the physical tests associated with each of the compositions are denoted on Table 2.

TABLE 2

|  | Example: | | | | |
| --- | --- | --- | --- | --- | --- |
|  | 1 | 2 | 3 | 4 | 5 |
| Flexural Stress, psi. | 1760 | 1780 | — | — | — |
| Flexural Modulus, psi. | 52000 | 48000 | 46000 | 57000 | 100000 |
| Yield Strength, psi | — | — | 2220 | 4200 | 1290 |
| Yield Elongation, % | — | — | 20 | 50 | 20 |
| Ultimate Tensile Strength, psi. | 3400 | 3300 | 2440 | 4300 | 1500 |
| Ultimate Elongation, % | 135 | 120 | 130 | 95 | 35 |
| Shore D Hardness | 46 | 44 | — | 47 | 22 |

The following examples illustrative of certain embodiments of the invention are compositions which do include magnesium oxide.

Examples 6-13

A composition was formulated to illustrate the physical properties of a composition within the scope of the invention and wherein the ratio of nylon to the polyolefin was varied within the range of approximately 55:45 to approximately 45:55; a control sample of nylon 12 was also produced. The samples of Examples 6-9 were tested for their resistance to zinc chloride solutions.

The compositions included; Surlyn 9721, and Exxon #5 both of which have been previously described. Further constituents include: Nylon 1539 a random copolymer consisting of 85 weight percent caprolactam, and 15 weight percent of hexamethylene adipamide, which is characterized as having balanced terminal end groups, and having a formic acid viscosity (FAY) of approximately 85, Nylon 12, a homopolymer of polylaurolactam which is characterized as having a medium viscosity extrusion grade material commonly used for extrusion of tubing and pipes. A heat stabilizer for polymeric compositions, "HSMB", comprises a nylon master batch which includes nylon 6, and further including cuprous iodide and potassium bromide in weight percents of 2.1% and 22.5% respectively. A further constituent is magnesium oxide, MgO, commercially available from Fischer Scientific.

To form the compositions of Examples 6–9, the constituents were first combined by dry mixing, and extruded in accordance with the procedure outlined with reference to Examples 1–5. These compositions are outlined on Table 3.

TABLE 3

| | Example: | | | | | | | |
|---|---|---|---|---|---|---|---|---|
| | 6 | 7 | 8 | 9 | 10 | 11 | 12 | 13 |
| Nylon/ionomer ratio: | 55:45 | 50:50 | 45:55 | | | | | |
| Nylon 12 | — | — | — | 100 | — | — | — | — |
| Nylon 1539 | 54 | 49 | 44 | — | — | — | — | — |
| Nylon 6 | — | — | — | — | 48.6 | 49 | 43.6 | 49 |
| Surlyn 9721 | 27 | 30 | 33 | — | 30 | 30 | 33 | 30 |
| Exxon #5 | 18 | 20 | 22 | — | 20 | 20 | 22 | 20 |
| HSMB | 1 | 1 | 1 | — | 1 | 1 | 1 | 1 |
| MgO | 0.25 | 0.25 | 0.25 | — | 0.4 | — | 0.4 | — |

Test specimens in the shape of test bars having a length of 5 inches, a width of ½ inch and a thickness of were prepared on a Van Dorn molding machine set at a temperature approximately 30 deg. C. above the melting point of the polyamide constituent. The mold temperature was maintained at 48.8 deg. C. (120 deg. F.). The molding cycle was 10 to 25 seconds forward ram, and 20 to 30 seconds on hold. The test specimens formed were subsequently subjected to physical testing in accordance with ASTM D-638 to evaluate the tensile and elongation characteristics, and in accordance with ASTM D-790 to determine the flexural modulus. The Shore D hardness was evaluated in accordance with the guidelines of ASTM D-1484.

To evaluate the resistance of formed articles to zinc chloride solutions, and the physical properties after immersion to these solutions, the following testing protocol was used.

For the tested compositions, molded test bars or extruded tubing comprising the compositions were tested. The molded bars tested were 5 inches in length, ½ inch in width and ⅛ inch in thickness, and were molded and conditioned by placing the same in a hot air circulating oven at 70 deg. C. for 12 hours. The bar was then cooled to room temperature (approximately 20 deg. C.) and bent into a "U" or "horseshoe" shape and immediately immersed in a vessel containing aqueous $ZnCl_2$ solutions. Where extruded tubing was tested, an extruded tube having an external diameter of ⅜ inch was extruded, and then conditioned at 70 deg. C. The conditioned tube was then cooled, and a #6 jacketed Romex wire was fully inserted in the tube, after which the wire and tube were bent into a "U" or "horseshoe" shape and immersed in a vessel (which as immediately sealed thereafter) containing aqueous $ZnCl_2$ solutions. Two different solutions were used, 50% $ZnCl_2$ solutions at room temperature, or alternatively, 25% $ZnCl_2$ solutions at 60 deg. C., both for a period of 8 days. The bars were subsequently subjected to physical testing in accordance with procedures already described, and evaluated for cracking, appearance and delamination. With regard to appearance evaluation, little or no change in the surface appearance of a test bar subsequent to soaking was denoted as "excellent"; the appearance of white spots and/or dullness on the surface was denoted as "fair". With regard to delamination, tensile bar after elongation testing which showed no delamination were rated as "none", those exhibiting minor amounts of delamination were denoted as having "little", and those which exhibited appreciable amounts of delamination were denoted as having "appr." indicative of appreciable delamination. The results of these tests is outlined on Table 4.

TABLE 4

| | Example: | | | | | | | |
|---|---|---|---|---|---|---|---|---|
| | 6 | 7 | 8 | 9 | 10 | 11 | 12 | 13 |
| Flexural Stress, psi. | | | | | 5600 | 5100 | 3900 | 4100 |
| Flexural Modulus, psi. | 125000 | 110000 | 89000 | 80000 | 138000 | 126000 | 89 | 95 |
| Yield Strength, psi. | | | | | | | | |
| Yield Elongation, % | | | | | | | | |
| Tensile Strength, psi. | 4200 | 3700 | 3300 | 4500 | 3900 | 4250 | 3400 | 3600 |
| Tensile Elongation, % | | | | | 300 | 340 | 330 | 310 |
| Shore D Hardness | | | | | | | | |
| Mold Bar Appearance | | | | | fair | excellent | excellent | excellent |
| Delamination | | | | | none | appr. | little | little |

In light of the foregoing description and the accompanying examples, it can be seen that articles formed from the compositions taught hererin exhibit good physical properties, are highly resistant to degradation in zinc chloride solutions, and feature thermoplastic behaviour uncharacteristic to common compositions comprising polyamides.

It will be appreciated that the instant specifications and examples set forth herein are by way of illustration and not limitation, and that various modifications and changes may be made without departing from the spirit and scope of the present invention, whose limitations are bounded only by the appendant claims.

We claim:

1. A thermoplastic molding composition comprising:
   a) up to 50 weight percent of a polyamide;
   b) between 1 and 49 weight percent of at least one copolymer of ethylene and a $C_3$–$C_8$ α-olefin other than ethylene, wherein the copolymer has at least two grafted reactive moieties per copolymer molecule; and c) between 1 and 49 weight percent of an ionomer of at least one olefinic acid copolymers having;
  (i) units derived from an unmodified α-olefin of the formula $RCH=CH_2$ wherein R is hydrogen or an alkyl radical of 1–8 carbon atoms, and
  (ii) a second unit derived from an α,β-ethylenically unsaturated carboxylic acid and where the copolymer is between 10% and 100% neutralized by a metal ion.

2. The composition according to claim 1 wherein the polyamide is selected from the group consisting of: nylon 6, nylon 6,6.

3. The composition according to claim 1 wherein the polyamide has a number average molecular weight in the range of between 10,000 and 50,000.

4. The composition according to claim 3 wherein the polyamide has a a number average molecular weight in the range of between 15,000 and 40,000.

5. The composition according to claim 4 wherein the polyamide has a a number average molecular weight in the range of between 20,000 and 30,000.

6. The composition according to claim 1 wherein the modified ethylene copolymer comprises units of an $C_3$–$C_6$ α-olefin other than ethylene.

7. The composition according to claim 1 wherein the modified ethylene copolymer is an ethylene/propylene copolymer.

8. The compositon according claim 1 wherein the modified ethylene copolymer comprises at least 2 reactive moieties selected from carboxyl or carboxylate functionalities.

9. The composition according to claim 1 wherein the modified ethylene copolymer is the reaction product of an ethylene copolymer with an unsaturated reactive moiety of an α,β-ethylenically unsaturated dicarboxylic acid having from 4 to 8 carbon atoms.

10. The composition according to claim 1 wherein the modified ethylene copolymer is the reaction product of an ethylene copolymer with an unsaturated reactive moiety of a derivative of an α,β-ethylenically unsaturated dicarboxylic acid having from 4 to 8 carbon atoms.

11. The composition according to claim 1 wherein the ionomer is a terpolymer comprising the α-olefin and the α,β-ethylenically unsaturated carboxylic acid and a monoethylenically unsaturated monomers.

12. The composition according to claim 1 wherein the ionomer is neutralized by a metal ion selected from Group I–Group VIIIB metals.

13. The composition according to claim 12 wherein the metal ion used to form the ionomer is a zinc ion.

14. The composition according to claim 1 which exhibits resistance to stress cracking when immersed in a zinc chloride solutions.

15. A thermoplastic molding composition comprising:
a) up to 50 weight percent of a polyamide;
b) between 1 and 49 weight percent of at least one copolymer of ethylene and a $C_3$–$C_8$ α-olefin other than ethylene, wherein the copolymer has at least two grafted reactive moieties per copolymer molecule; and
c) between 1 and 49 weight percent of an ionomer of at least one olefinic acid copolymer having:
  (i) units derived from an unmodified α-olefin of the formula $RCH=CH_2$ wherein R is hydrogen or an alkyl radical of 1–8 carbon atoms, and
  (ii) a second unit derived from an α,β-ethylenically unsaturated carboxylic acid and where the copolymer is between 10% and 100% neutralized by a metal ion,
whereby the thermoplastic molding composition is formed in a single process step in which the polyamide, the modified ethylene copolymer and the ionomer are melt blended in a single operation.

16. The thermoplastic molding composition according to claim 15 wherein the modified ethylene copolymer is an ethylene/propylene copolymer.

17. The thermoplastic molding composition according to claim 16 wherein the modified ethylene copolymer is reacted with an unsaturated reactive moiety of a derivative of an α,β-ethylenically unsaturated dicarboxylic acid having from 4 to 8 carbon atoms.

18. The thermoplastic molding composition according to claim 15 wherein the ionomer is a terpolymer comprising the α-olefin and the α,β-ethylenically unsaturated carboxylic acid and a monoethylenically unsaturated monomers which is neutralized with zinc ions.

19. The thermoplastic molding composition according to claim 15 which exhibits resistance to stress cracking when immersed in a zinc chloride solutions.

* * * * *